Dec. 13, 1932.  W. WILLIAMS  1,890,800
ELECTRIC MOTOR
Filed June 21, 1930   2 Sheets-Sheet 1
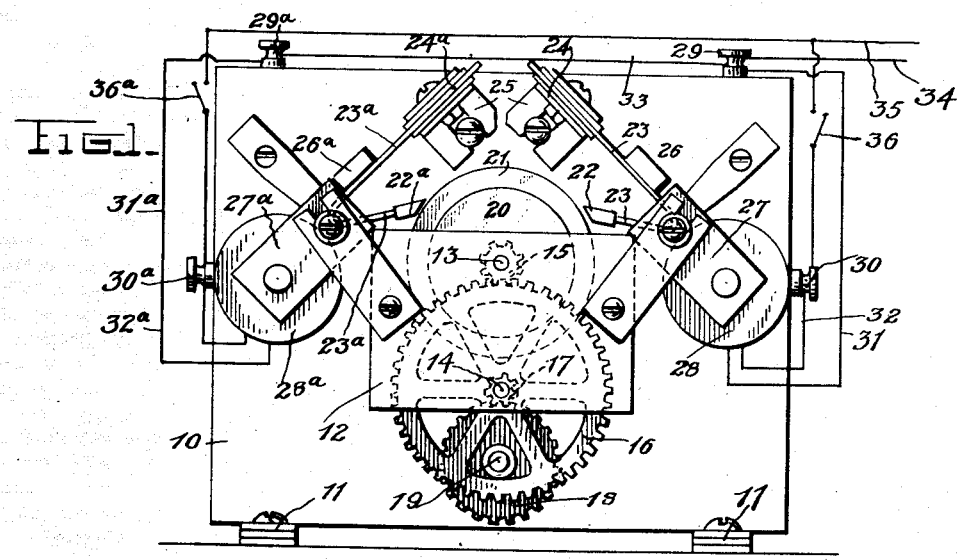
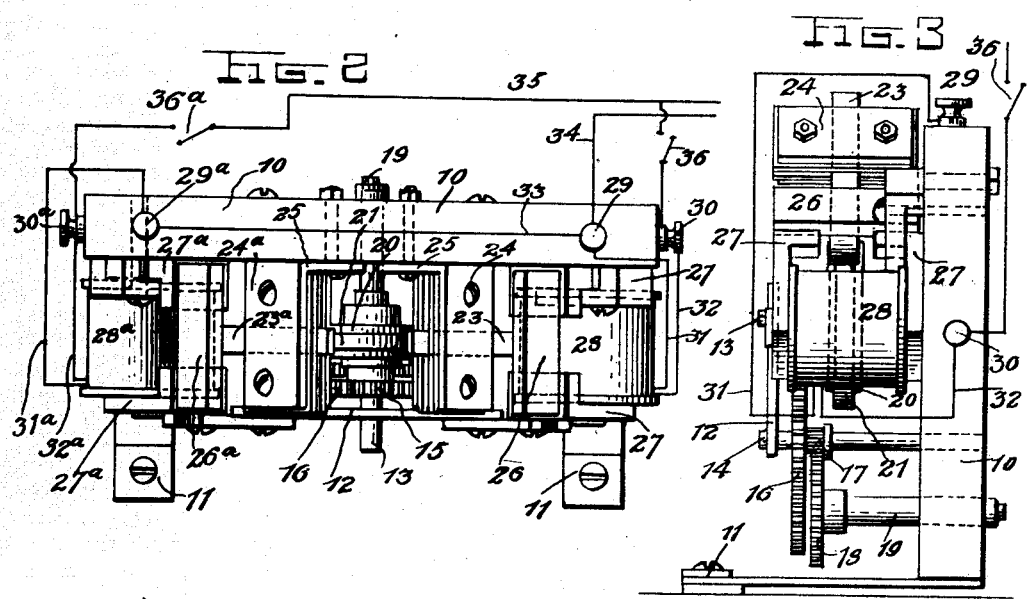
Inventor
Ward Williams
By H. B. Wilson & Co.
Attorneys.
Witness
C. S. Hunt.

Dec. 13, 1932.  W. WILLIAMS  1,890,800
ELECTRIC MOTOR
Filed June 21, 1930  2 Sheets-Sheet 2

Witness
C. E. Hunt

Inventor
Ward Williams
By H. B. Wilson & Co
Attorneys

Patented Dec. 13, 1932

1,890,800

UNITED STATES PATENT OFFICE

WARD WILLIAMS, OF BRANDON, WISCONSIN

ELECTRIC MOTOR

Application filed June 21, 1930. Serial No. 462,839.

The invention aims to provide an exceptionally simple and inexpensive, yet an efficient and reliable electric motor for light work, for instance, radio tuning and sign operation purposes.

The motor is of a type in which rotation of a wheel is effected by electro-magnetic vibration of an armature and a friction pawl, and it aims to provide an improved construction in which the armature and pawl are carried by an inherently resilient arm, in which the pawl is normally out of contact with the wheel to allow turning of the latter by hand if desired, and in which there is no liability of the armature or the arm striking the pole-piece of the electro-magnet with which said armature co-acts.

With the foregoing in view, the invention resides in the novel subject matter hereinafter described and claimed, description being accomplished by reference to the accompanying drawings.

Fig. 1 is a side elevation showing one form of motor constructed in accordance with my invention.

Fig. 2 is a top plan view.

Fig. 3 is an end elevation.

Figure 4:
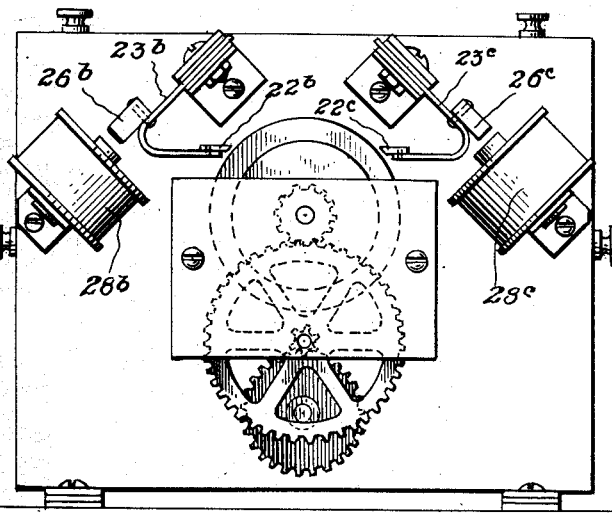
Fig. 4 is a view similar to Fig. 1 showing a slightly different construction, all wiring being omitted for sake of clearness.

The details herein disclosed may be considered primarily for illustrative purposes, it being possible within the scope of the invention as claimed, to produce numerous variations and refinements. However, for sake of imparting a clear understanding of the invention, the structures illustrated will be rather specifically explained, reference being first made to Figs. 1, 2 and 3.

The numeral 10 denotes a vertical panel of insulation having appropriate supporting feet 11. A plate 12 is spaced forwardly from the panel 10, and upper and lower shafts 13 and 14 extend between and are rotatably supported by said plate and panel, the upper shaft 13 being provided with a pinion 15 meshing with a gear 16 on the shaft 14. Shaft 14 is also provided with a pinion 17 meshing with a gear 18 on a power take-off shaft 19.

Secured to the shaft 13 between the panel 10 and the plate 12, is a wheel 20, the peripheral portion 21 of which is formed from rubber or other resilient friction material. Co-operable with the periphery of the wheel 20 for driving the latter in one direction, is a friction pawl 22, while a similar pawl 22$^a$ is provided for co-action with the wheel periphery in driving said wheel in the opposite direction. Pawls 22 and 22$^a$ are preferably, although not necessarily formed from rubber, and they are fixedly carried on the free ends of two spring arms 23 and 23$^a$, the other ends of these arms being insulated from and fastened by two clamps 24 and 24$^a$ respectively, which are secured at 25 to the panel 10. The arms 23 and 23$^a$ are of such shape and are so anchored that they may vibrate in directions to move their respective pawls 22 and 22$^a$ substantially tangentially with respect to the wheel 20, and provision is made for effecting such vibration of one arm or the other in accordance with the direction in which the motor is to be driven. Each time one of the arms swings inwardly, its friction pawl kicks the peripheral portion 21 of the wheel 20, the arm then immediately swings outwardly so that the pawl clears the wheel, and each of these kicks imparts a turning movement to the wheel so that vibration of the arm at high frequency, will effect rather rapid rotation of the wheel and the gearing driven thereby.

Secured to the spring arms 23 and 23$^a$ are two armatures 26 and 26$^a$ respectively which are co-operable with but never touch the pole pieces 27 and 27ª of two electro-magnets 28 and 28ª. Provision is made in the present showing, for maintaining a closed alternating current circuit through either of the magnets 28 and 28ª and the alternations of the current cause the magnets to so act upon the armatures 26 and 26ª as to vibrate the spring arm 23 or 23ª, causing the friction pawl 22 or 22ª to alternately kick and recede from the periphery 21 of the wheel 20, and at each kick, a turning impulse is imparted to said wheel. When current is being passed through the magnet 28 to operate pawl 22, magnet 28ª is deenergized, and vice versa. As above explained, pawl 22 will drive the wheel 20 in one direction and pawl 22ª is used when it is desired to rotate it in the opposite direction.

Mounted on the panel 10 in the present showing, are two binding posts 29 and 30 which are connected by conductors 31 and 32 with the two terminals of the electro-magnet 28. Two additional binding posts 29ª and 30ª are mounted on the panel 10 and are connected by conductors 31ª and 32ª with the terminals of the magnet 28ª. A conductor 33 extends between the binding posts 29 and 29ª and one wire 34 of a conducting line is connected with one of said binding posts. The other wire 35 of the conducting line is branched and connected with the binding posts 30 and 30ª respectively, the branches being provided with independent switches 36 and 36ª. Both switches normally remain open. Closing of switch 36 however maintains a closed alternating circuit through the magnet 28 to effect operation of pawl 22 to drive the motor in one direction. Closing of switch 36ª similarly maintains the current through the magnet 28ª to cause operation of the pawl 22ª thereby driving the motor in the opposite direction.

Attention is invited to the fact that the pole-pieces 27 and 27ª are permanently spaced from the armatures 26 and 26ª, in a direction transverse to the paths on which said armatures move as the arms 23 and 23ª oscillate. Moreover, the pole-pieces are entirely out of the paths of the arms 23 and 23ª. There is thus no possibility of the arms and armatures striking the pole-pieces and causing noise. Then too, the inherent resiliency of the arms 23 and 23ª, constitutes the sole means for limiting their oscillation, so that other limiting means with consequent noise, are not required. In the specific construction disclosed, the arms 23 and 23ª extend toward the electro-magnets 28 and 28ª and near the latter are given return bends locating their free ends between the wheel 20 and the major portions of the arms, and friction pawls or shoes 22 and 22ª are rigidly secured to said free ends of the arms. To permit hand-turning of the motor shaft when desired, the pawls or shoes 22 and 22ª are preferably normally out of contact with the wheel periphery 21, and said pawls or shoes merely kick said periphery successively as the arms 23 and 23ª oscillate or vibrate. At each kick, the free ends of the arms may yield slightly toward the body portion of the latter. While the pawls or shoes preferably co-act with the periphery of a wheel, by a slight re-arrangement of parts, they could engage a wheel side, as will be obvious without illustration.

Figures 5, 6:
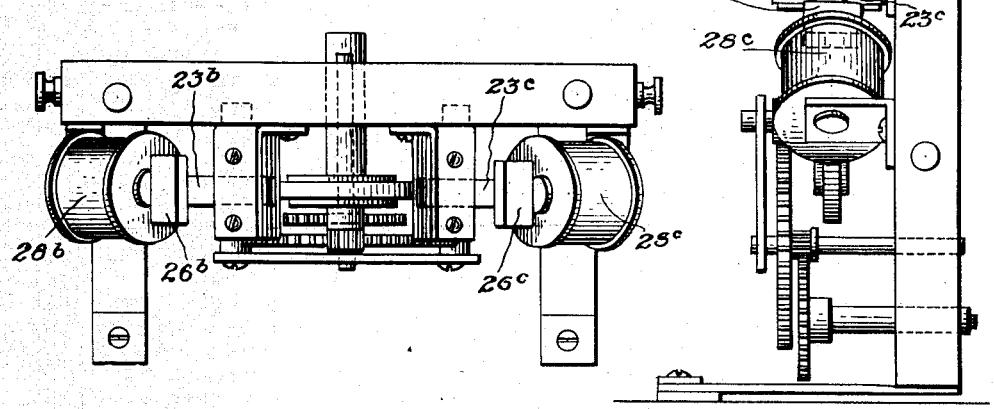
Fig. 5 is a plan view of the construction shown in Fig. 4.
Fig. 6 is an end elevation of the structure illustrated in Fig. 4.

The construction shown in Figs. 4, 5 and 6 may be considered as substantially identical with that above described, with the following exceptions: The pawls 22ᵇ and 22ᶜ are secured to the spring arms 23ᵇ and 23ᶜ in a slightly different manner, the armatures 26ᵇ and 26ᶜ are secured further down upon said spring arms, and the magnets 28ᵇ and 28ᶜ are mounted in different positions. The operation of all parts is the same as that above described.

It will be seen from the foregoing that novel provision has been made for carrying out the objects of the invention, and attention is again invited to the fact that within the scope of said invention as claimed, variations may be made.

What is claimed is:—

1. In a vibratory electric motor of the type embodying a friction wheel and a friction pawl adapted to successively strike said wheel to rotate the latter; an inherently resilient oscillatory arm fixedly mounted at one of its ends and carrying said pawl, the resiliency of said arm alone constituting means for limiting its oscillation, an armature secured to said arm and hence movable along a predetermined path as said arm oscillates, and a stationary electro-magnet entirely out of the path of said arm, said electro-magnet having a pole-piece co-operable with said armature for oscillating said arm, said pole-piece being permanently spaced from said armature in a direction transverse to said path of the armature to prevent contact of said pole-piece and armature, whereby a quiet motor having strong torque is provided.

2. In a vibratory electric motor, a support, a stationary electro-magnet mounted on said support, an inherently resilient arm fixedly secured at one of its ends upon said support and constructed to oscillate in a single plane, the resiliency of said arm alone constituting means for limiting its oscillation, a friction wheel mounted on said support and spaced from said arm in a direction in which said arm springs, said arm having a return bend near the magnet locating the free end of the arm between said friction wheel and the major portion of the arm, a friction pawl secured to said free end of said arm and co-operable with said wheel to drive the latter as the arm oscillates, and an armature secured to said arm substantially at said return bend and hence movable on a predetermined path as the arm oscillates, said electro-magnet having a pole-piece co-operable with said armature to oscillate said arm, said pole-piece being spaced from the armature in a direction transverse to said path of said armature to prevent contact of said pole-piece and armature, whereby a quite motor having strong torque is provided.

In testimony whereof I affix my signature.

WARD WILLIAMS.